United States Patent
Stein

(10) Patent No.: US 9,780,541 B1
(45) Date of Patent: Oct. 3, 2017

(54) SPLICE CASE ALIGNMENT CUTOUTS

(71) Applicant: CenturyLink Intellectual Property LLC, Denver, CO (US)

(72) Inventor: Bradley Stein, Omaha, NE (US)

(73) Assignee: CenturyLink Intellectual Property LLC, Denver, CO (US)

(*) Notice: Subject to any disclaimer, the term of this patent is extended or adjusted under 35 U.S.C. 154(b) by 0 days.

(21) Appl. No.: 15/142,983

(22) Filed: Apr. 29, 2016

(51) Int. Cl.
*H02G 1/00* (2006.01)

(52) U.S. Cl.
CPC .................... *H02G 1/005* (2013.01)

(58) Field of Classification Search
USPC ........................................... 174/92, 93
See application file for complete search history.

(56) References Cited

U.S. PATENT DOCUMENTS

| | | | | |
|---|---|---|---|---|
| 4,558,174 A | * | 12/1985 | Massey | G02B 6/4447 174/78 |
| 5,793,921 A | * | 8/1998 | Wilkins | G02B 6/4446 174/77 R |
| 6,051,792 A | * | 4/2000 | Damm | H02G 15/007 174/92 |

* cited by examiner

*Primary Examiner* — Dhirubhai R Patel
(74) *Attorney, Agent, or Firm* — Swanson & Bratschun, L.L.C.

(57) ABSTRACT

A splice case alignment cutout is provided. The splice case alignment cutout may include a body having an interior surface and an outer surface. The body may be configured to have a length and a width, wherein the body is configured to releasably attach to one of a left side distal end or right side distal end of a back cover member. The splice case alignment cutout may further include an endplate seating channel spanning the length of the body along the interior surface of the body. The endplate seating channel may be configured to allow a rim of an endplate to seat into the interior surface of the frame. When the endplate is seated in the endplate seating channel and releasably attached to the back cover member, the endplate seating channel may be configured to align the endplate with respect to the back cover member.

11 Claims, 3 Drawing Sheets

SPLICE CASE ALIGNMENT CUTOUTS

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to splice case enclosures, and more particularly to an alignment system for splice case enclosures.

BACKGROUND

Conventional analog and digital telecommunications rely on cables, fiber optics, telephone lines, and other communication lines to serve as wired transmission media to carry communication signals. Over time, these physical wired transmission media may need to be replaced, repaired, or connected to other communication lines. This will often require the communication lines to be spliced to other communication lines.

In the case of copper cable splices, it is important to maintain a moisture-proof environment to protect the cable splices from corrosion and environmental wear. It is also important to protect the cable splices from physical shock and exposure to dirt, soil, and dust. Therefore, splices are typically protected in splice case enclosures. Some splice case enclosures, in addition to providing physical protection to the splice, are able to maintain a vacuum sealed environment, keeping out external moisture as well as reducing the chance of condensation occurring on the cable splice.

In many cases, the splice case enclosures are modular systems including various parts. In order to ensure the case can properly maintain a vacuum seal, the parts of the splice case enclosure must be carefully aligned. Conventional alignment techniques require the use of bulky, difficult to use, and difficult to maneuver alignment tools. Oftentimes, cable splices are made in an underground vault with limited space to maneuver the cables, splice case, and required alignment tools. Moreover, the weight of the cables and splice case enclosures make it very difficult for a single technician to position the cables, mount the splice case enclosures, and properly align the splice case enclosure.

Thus, a system for splice case alignment is provided by the embodiments below.

BRIEF SUMMARY

According to various embodiments, a system, apparatus, and method for splice case alignment are provided.

In an aspect, a system for splice case alignment may include at least two endplates, a back cover member, and at least two splice case alignment cutouts. The at least two endplates may include at least one left endplate, and at least one right endplate. Each endplate may have a substantially planar structure that includes an outer surface facing outwardly away from a splice chamber, an inner surface facing toward the splice chamber, and a rim defining a thickness of the endplate and configured to form an airtight seal when coupled to a splice case cover. The endplates may further include one or more cable entry apertures configured to seat a cable to allow it to passing through the endplate. The back cover member of the splice case may extend longitudinally and have a left distal end and a right distal end. The left distal end and the right distal end of the back cover member may each respectively comprise an endplate seating channel extending transversely along an interior surface of the back cover member. The endplate seating channel may be configured to allow the rim of a respective endplate to seat into one of the left distal end or right distal end respectively. The at least two splice case alignment cutouts may include a left side splice case alignment cutout and a right side splice case alignment cutout. The left side splice case alignment cutout may be configured to releasably attach to the left distal end of the back cover member, and the right side splice case alignment cutout may be configured to releasably attach to the right distal end of the back cover member. The at least two splice case alignment cutouts may each respectively include endplate seating channels along an interior surface of each of the at least two splice case alignment cutouts. The endplate seating channels may also be configured to allow the rim of a respective endplate to seat into the left side and right side splice case alignment cutouts. The at least two splice case alignment cutouts may be configured such that when the at least one left endplate is seated in the endplate seating channels of the left distal end and the left side splice case alignment cutout, and the at least one right endplate is seated in the endplate seating channels of the right distal end and the right side splice case alignment cutout, and the at least two splice case alignment cutouts are releasably attached to the back cover member, each of the at least one left endplate and the at least one right endplates are aligned with respect to the back cover member.

In some embodiments, the at least two splice case alignment cutouts may respectively include one or more mounting flanges configured to releasably attach the at least two splice case alignment cutouts to the left distal end or the right distal end of the back cover member, respectively. In some further embodiments, the at least two splice case alignment cutouts may also include an alignment guide for engaging to the back cover member. In one set of embodiments, the alignment guide may be an alignment bolt. In another set of embodiments, the alignment guide may be a quick-release lock pin, wherein the back cover member may correspondingly include a quick-release pin receptacle at each of the left distal end and right distal end.

In various embodiments, the system may include a front cover member of the splice case cover extending longitudinally and having a left distal end and a right distal end. Each of the each of the left distal end and right distal end of the front cover member may respectively comprise an endplate seating channel extending transversely along the interior of the front cover member. The endplate seating channel may be configured to allow the rim of a respective endplate to seat into the left and right distal ends. The splice chamber may thus be defined by a volume formed between the at least two endplates, the back cover member, and the front cover member. The at least two splice case alignment cutouts may be configured to be removable, wherein once the at least two cutouts are removed, the front cover member may be configured to releasably attach to the back cover member and seat the at least two endplates while alignment is maintained between the at least two endplates and the back cover member.

According to some embodiments, the endplate seating channels of the back cover member and the at least two splice case alignment cutouts may be at least one of a depression, lip, ridge, baffle, or any combination of depression, lip, ridge, and baffle. In one set of embodiments, the respective rims of the at least two endplates may include depression configured to seat at least one of a lip or baffle of a respective endplate seating channel. In another set of embodiments, the endplate seating channel may be a single one of a lip, ridge, or baffle configured to laterally abut at least one of the outer surface or inner surface of the at least one left endplate or at least one right endplate.

In another aspect a splice case alignment cutout is provided. The splice case alignment cutout may include a body and an endplate seating channel. The body may have an interior surface and an outer surface, the body configured to have a length and a width, wherein the body is configured to releasably attach to one of a left side distal end or right side distal end of a back cover member. The endplate seating channel may span the length of the body along the interior surface of the body. The endplate seating channel may be configured to allow a rim of an endplate to seat into the interior surface of the frame. When the endplate is seated in the endplate seating channel and releasably attached to the back cover member, the endplate seating channel may be configured to align the endplate with respect to the back cover member.

According to various embodiments, the splice case alignment cutout may include one or more mounting flanges configured to releasably attach the splice case alignment cutout to one of the left distal end or the right distal end of the back cover member. In some further embodiments, the splice case alignment cutout may further include an alignment guide for engaging the back cover member. In one set of embodiments, the alignment guide may be an alignment bolt. In another set of embodiments, the alignment guide may be a quick-release lock pin, wherein the back cover member further includes a quick-release pin receptacle at the left distal end or the right distal end.

In various embodiments, the body may be configured to be removable, wherein once the splice case alignment cutout is removed from the back cover member, a front cover member may be releasably attached to the back cover member and seat an at least two endplates including the endplate while alignment is maintained between the at least two endplates and the back cover member. In further embodiments, the endplate seating channel may include at least one of a depression, lip, ridge, baffle, or any combination of depression, lip, ridge, and baffle. In one set of embodiments, the rim of the endplate further comprises a depression configured to seat at least one of a lip or baffle of the endplate seating channel. In another set of embodiments, the endplate seating channel may be a single one of a lip, ridge, or baffle configured to laterally abut at least one of an outer surface or an inner surface of the endplate.

In another aspect, a method of splice case alignment is provided. The method may include providing at least two splice case alignment cutouts comprising a left side splice case alignment cutout and a right side splice case alignment cutout. The left side splice case alignment cutout may be configured to releasably attach to a left distal end of a back cover member, and the right side splice case alignment cutout may be configured to releasably attach to a right distal end of a back cover member. The at least two splice case alignment cutouts may each respectively include endplate seating channels along an interior surface of each of the at least two splice case alignment cutouts and may be configured to allow a rim of a respective endplate to seat into the left side or right side splice case alignment cutouts. The method may further include aligning the at least two splice case alignment cutouts with the back cover member, the left side splice case alignment cutout to the left distal end of the back cover member and the right side splice case alignment cutout to the right distal end of the back cover member. The method may further include seating, via the left side splice case alignment cutout, a left endplate within the endplate seating channel of the left side splice case alignment cutout, and seating, via the right side splice case alignment cutout, a right endplate within the endplate seating channel of the right side splice case alignment cutout. The method may include releasably attaching each of the at least two splice case alignment cutouts to the left distal end and the right distal end of the back cover member, respectively.

In various embodiments, the at least two splice case alignment cutouts may each respectively include an alignment guide, wherein the method further includes aligning each respective alignment guide with a receiving interface of the back cover member; and releasably attaching the at least two splice case alignment cutouts to the back cover member via the alignment guide.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Figure 1:
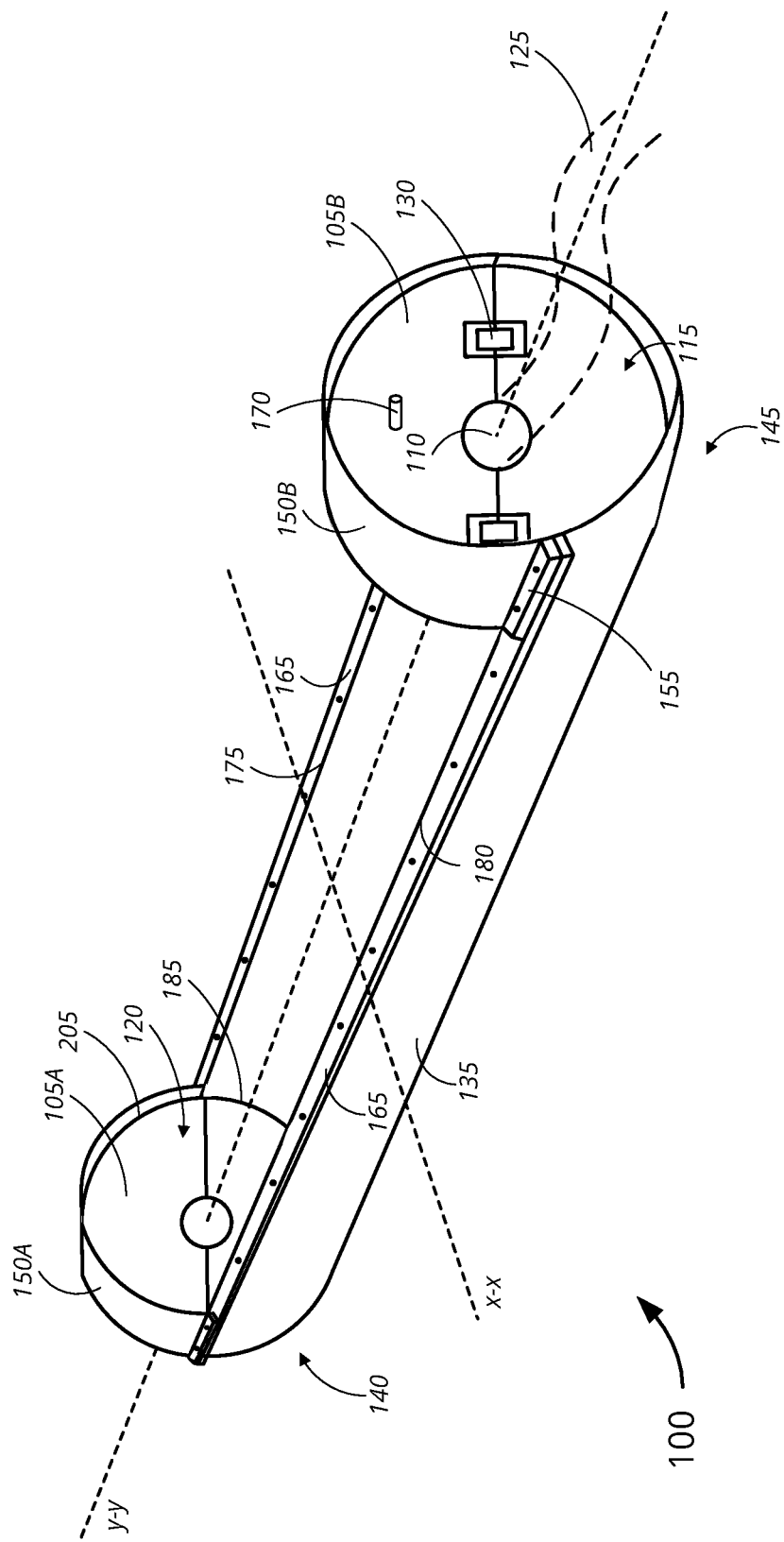
FIG. 1 is a perspective view of a splice case alignment system, in accordance with various embodiments.

FIG. 1 illustrates a system 100 for splice case alignment, in accordance with various embodiments. The system 100 includes a left endplate 105A and a right endplate 105B (collectively, endplates 105), a left side splice case alignment cutout 150A and a right side splice case alignment cutout 150B (collectively, splice case alignment cutouts 150), and a back cover member 135. Each of the endplates 105 may include a cable entry aperture 110, an exterior facing surface 115 and an interior facing surface 120, and, in some (but not necessarily all) embodiments, a latch 130. The back cover member 135 may have an elongated shape, extending longitudinally, from a left distal end 140 to a right distal end 145. The back cover member 135 may further include sealing flanges 165 extending longitudinally on one or more sides of the back cover member 135, from the left distal end 140 to the right distal end 145. Each of the splice case alignment cutouts 150 may also include a mounting flange 155.

In various embodiments, a splice case enclosure may be provided to protect and form a seal around a cable splice. The splice case enclosure may include the back cover member 135, a front cover member (not shown), and the endplates 105. In one set of embodiments, the back cover member 135 and front cover member may have an elongated structure extending longitudinally. The back cover member 135 and front cover member may, combined, have a substantially axial transverse cross-sectional shape, such as a cylinder. Accordingly, each of the front cover member and back cover member 135 may have a semi-circular transverse cross-section. However, it is to be understood that the back cover member 135 and front cover member may come in various shapes, sizes, and configurations and the above description is provided as an example only. In one set of embodiments, the back cover member 135 may be coupled to the front cover member via a hinge, allowing the front cover member and back cover member 135 to flip open or shut.

Each of the endplates 105 may have a substantially planar structure, and have a shape corresponding to the interior shape of the front cover member and back cover member 135. For example, in one set of embodiments, the endplates 105 may have an axial shape corresponding to a shape formed by the interiors of the front cover member and back cover member 135. The endplate 105 may include an inner surface (i.e., interior facing surface 120) facing towards a splice chamber, an outer surface (i.e., exterior facing surface 115) facing outwardly away from the splice chamber, and a rim defining a thickness of the endplate 105. In some embodiments, the endplates 105 may also be modular, comprising one or more separate pieces. In such embodiments, the endplates 105 may further include, without limitation, one or more latches 130, locks, clips, clamps, ties, straps, or clamps. In other embodiments, the one or more pieces of each endplate may alternatively be joined together via adhesives, tension fit, or other suitable techniques.

According to various embodiments, each of the cables 125, to be spliced or already spliced together, may be seated within a respective cable entry aperture 110 of a respective endplate 105. The cables 125 may include, without limitation, one or more twisted pair copper cables, fiber optic cables, telephone cables, or any other types of cable used in telecommunications. The cable splice may be contained within a splice chamber, the splice chamber being a volume defined by the interior surfaces of the front cover member, back cover member 135, and endplates 105.

According to some embodiments, the splice case enclosure may be configured to create and maintain a vacuum-sealed or negative pressure environment. Specifically, the endplates 105 may form a vacuum seal with the front cover member and back cover member 135. In one set of embodiments, the endplates 105 may further include a vacuum pump interface 170. The vacuum pump interface 170 may allow a vacuum pump system to be coupled to the splice chamber. The vacuum pump system may then evacuate air or other fluid in the splice chamber, via the vacuum pump interface. The vacuum pump interface 170 may include, without limitation, a pressure valve stem, or other suitable pressure valve assembly.

According to various embodiments, the front cover member may be releasably attached to the back cover member 135, via respective sealing flanges 165. Both the front cover member and back cover member 135 may include sealing flanges 165. On the back cover member 135, the sealing flange 165 may extend laterally outward, one sealing flange 165 extending laterally from a back edge 175 of the back cover member 135, and another sealing flange 165 from a front edge 180 of the back cover member 135, both sealing flanges 165 extending from the left distal end 140 to the right distal end 145. The front cover member may mirror this configuration, having sealing flanges 165 that extend the length of the front cover member, from a left distal end 140 to a right distal end 145. Accordingly, the sealing flange 165 of the front cover member may be attached to the sealing flange 165 of the back cover member 135. For example, in one set of embodiments, the sealing flanges 165 of the front cover member and back cover member 135 may be bolted together. It is to be understood that the front cover member and back cover member 135 may be attached at the sealing flanges 165 through other suitable techniques, as will be apparent to those skilled in the art. For example, in other embodiments, the sealing flanges 165 may be joined, without limitation, via adhesives, tension fit, interference fit, clips, latches, locks, clamps, ties, straps, or clamps.

Each of the front cover member and back cover member 135 may respectively include an endplate seating channel 185 at a left distal end 140, and an endplate seating channel 185 (not visible in FIG. 1) at a right distal end 145. The endplate seating channels 185 may be configured to allow the endplates 105 to be seated between each of the front cover member and back cover member 135. In various embodiments, the endplate seating channel 185 may extend transversely along the interior of the back cover member 135 and front cover member. In one set of embodiments, the endplate seating channel 185 may be a depression in the interior surface of the back cover member 135, into which an endplate 105 may seat. In other embodiments, the endplate seating channel 185 may be defined on either side by two raised ridges, creating a space into which the endplate 105 may seat. In other embodiments, other configurations may be utilized. For example, the endplate seating channel 185 may be, without limitation, a marking on the interior surface of the back cover member 135, a single raised lip that may seat into a rim of an endplate 105 having a depression in its rim to receive the raised lip, or a ridge, raised lip, or baffle against which one of the exterior facing surface 115 or the interior facing surface 120 of the endplate 105 may laterally abut. When the endplates 105 are seated in the endplate seating channels 185, and aligned with respect to the back cover member 135 and front cover member, the endplates 105 may seal each end of the splice case enclosure.

In various embodiments, the splice case alignment cutouts 150 may be configured to align a respective endplate 105 to the back or bottom cover member 135, before the front or top cover member is attached. With reference to FIG. 1, the splice case alignment cutouts 150 may have a length extending transversely across the back cover member 135, and a width extending along a longitudinal axis y-y of the back cover member 135. Accordingly, each of the splice case alignment cutouts 150 may have transverse cross-sectional shape corresponding to the shape of the endplate 105. Thus, for example, if the endplate 105 is circular, the splice case alignment cutouts 150 may similarly have a semi-circular transverse cross-section, allowing the splice case alignment cutouts 150 to fit around the rim of the endplate 105. The splice case alignment cutouts 150 may further have a length that allows the splice case alignment cutouts 150 to reach from the back edge 175 of the back cover member 135 to the front edge 180 of the back cover member 135. However, different from the front cover member, the splice case alignment cutouts 150 do not have a width that coincides with the length of the back cover member. Rather, the width of the splice case alignment cutouts 150 correspond to a width needed to attach the splice case alignment cutouts 150 to an appropriate distal end 140, 145 of the back cover member 135, while also seating and aligning the endplate 105. For example, with reference to FIG. 2, similar to the front cover member, each of the splice case alignment cutouts 150 may further include an endplate seating channel 205. The endplate seating channel 205 of the splice case alignment cutouts 150 may allow the rim of the endplate 105 to seat into the splice case alignment cutouts 150. Thus, a left side splice case alignment cutout 150A may have an endplate seating channel 205 corresponding to a left endplate 105A, and configured to releasably attach to the left distal end 140 of the back cover member 135. Correspondingly, the right side splice case alignment cutout 150B may respectively have an endplate seating channel 205 for a respective right endplate 105B, and configured to releasably attach to the right distal end 145 of the back cover member 135.

According to various embodiments, the splice case alignment cutouts 150 may be configured to releasably attach to the sealing flanges 165 of the back cover member 135. The left side cutout 150A may be configured to have a set of mounting flanges 155, extending from a back edge 175, and front edge 180, configured to attach to the sealing flanges 165 at the left distal end 140 of the back cover member 135. The right side cutout 150B may be configured to have a set of mounting flanges 155, extending from the back edge 175 and front edge 180, configured to attach to the sealing flanges 165 of the right distal end 145 of the back cover member 135. In various embodiments, the respective mounting flanges 155 of each of the splice case alignment cutouts 150 may be secured to the sealing flanges 165 of the back cover member. For example, in one set of embodiments, the mounting flanges 155 may be bolted to the sealing flanges 165. In some embodiments, the mounting flanges 155 may be secured to the sealing flanges 165, without limitation, via hooks, ties, screws, clips, latches, interference fit, or friction fit. In further embodiments, with reference to FIG. 2, the mounting flanges 155 may alternatively include one or more alignment guides 220, configured to seat into a receiving interface and restrict lateral movement of the splice case alignment cutouts 150 relative to the back cover member 135. In some embodiments, the receiving interface may be a threaded hole, configured to allow a front cover member to be bolted to the back cover member 135, while in other embodiments, the receiving interface may be a separate hole dedicated to receiving the one or more alignment guides 220.

According to various embodiments, the splice case alignment cutouts 150 are configured so that when the endplates 105 are seated in the respective endplate seating channels 205 of the splice case alignment cutouts 150 and endplate seating channels 185 of the back cover member 135, and the splice case alignment cutouts 150 are attached to the back cover member 135 as described above, the endplates 105 are each respectively aligned to the back cover member 135. Once aligned, the endplates 105 may be properly seated into an endplate seating channel 185 of a front cover member, and a vacuum seal may successfully be created between the endplates 105 and both the front cover member and back cover member 135 when the front cover member is attached to the back cover member 135.

Each time a new splice case is installed, or a splice case is opened via removal of the front cover member, the endplates 105 must be aligned to ensure that a vacuum seal can be created. The splice case alignment cutouts 150 provide a useful tool to align the endplates 105 relative to the back cover member 135, without the need to use conventional alignment tools. Various use cases will be described in further detail below with respect to FIG. 3.

Figure 2:
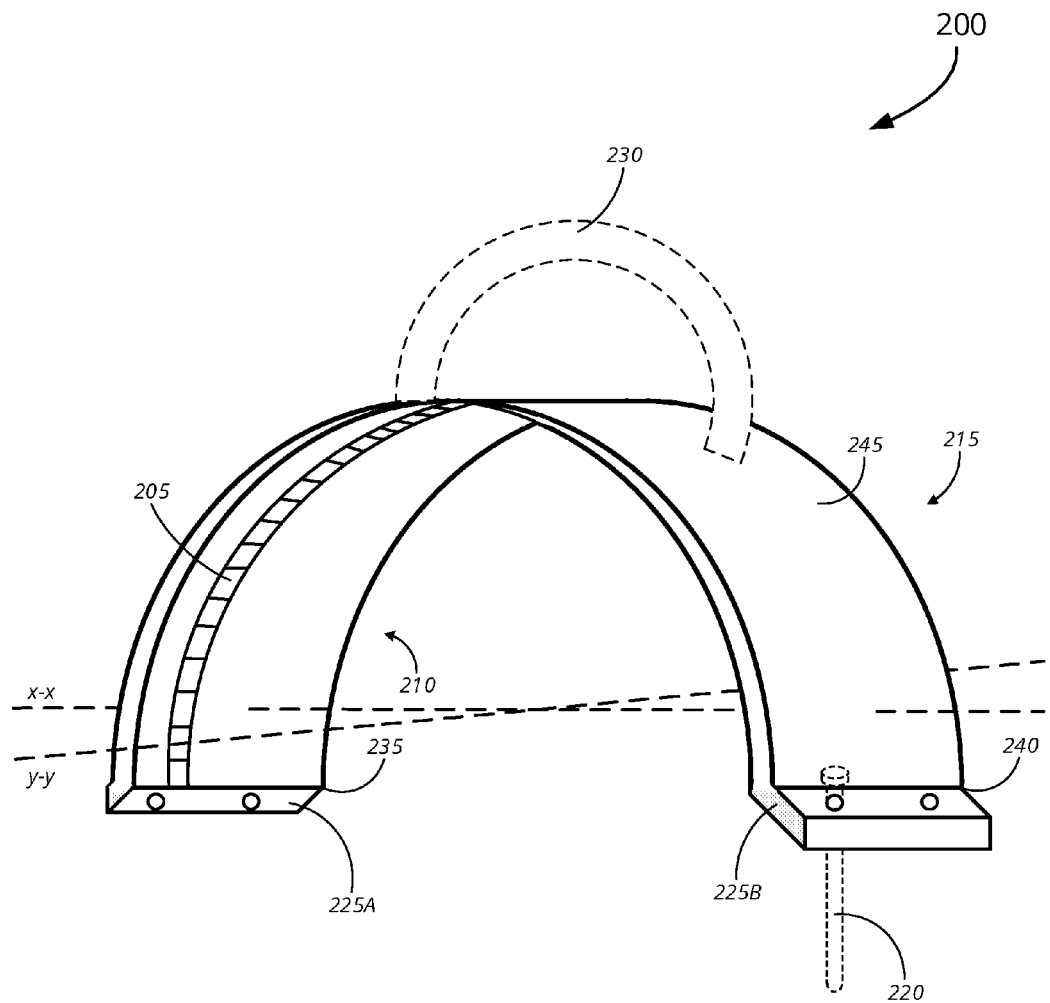
FIG. 2 is a perspective view of a splice case alignment cutout, in accordance with various embodiments.

FIG. 2 illustrates a perspective view of a splice case alignment cutout 200, in accordance with various embodiments. The splice case alignment cutout 200 may include a body 245 having an endplate seating channel 205, interior surface 210, exterior surface 215, optional alignment guide 220, a back edge 235 mounting flange 225A and a front edge 240 mounting flange 225B (collectively, mounting flanges 225), and an optional carrying handle 230. According to various embodiments, the splice case alignment cutout 200 may have a shape configured to receive and seat an endplate 105 (shown in FIG. 1). With reference to FIG. 1 and back cover member 135, the splice case alignment cutout 200 may have a length extending along a transverse axis x-x of the back cover member 135, and a width measured across along a longitudinal axis y-y of the back cover member 135. Accordingly, each splice case alignment cutout 200 may have a transverse cross-sectional shape corresponding to the shape of the endplate 105. For example, in one set of embodiments, the splice case alignment cutout 200 may have a substantially curved shape so as to have a semi-circular transverse cross-section. It is to be understood that in other embodiments, other shapes of cutouts may be utilized corresponding to a shape of the endplate 105 being utilized. For example, the splice case alignment cutout 200 may have, without limitation, squared, polygonal, curved, or irregularly shaped transverse cross sections.

In various embodiments, an endplate seating channel 205 may be provided to further allow an endplate 105 to be seated within the interior surface 210 of the splice case alignment cutout 200. The endplate seating channel 205 may be configured to secure the position of the endplate 105 against the splice case alignment cutout 200, and relative to a back cover member 135 as described above. Accordingly, the endplate seating channel 205 may span the length of the splice case alignment cutout, from the back edge 235 to the front edge 240. In some of embodiments, the endplate seating channel 205 may be a single continuous feature of the interior surface 210. In other embodiments, the endplate seating channel 205 may have other configurations. For example, in some embodiments, the endplate seating channel 205 may include multiple, non-continuous sections within or on the interior surface 210. In some embodiments, a continuous endplate seating channel 205 or multiple non-contiguous sections of the endplate seating channel 205 may only span a portion of the length of the interior surface 210. According to various embodiments, the endplate seating channel 205 may be defined by a depression within interior surface 210. In other embodiments, the endplate seating channel 205 may be defined by raised lips protruding from the interior surface 210, ridges defined by variations in the thickness of the interior surface 210, depressions, or any combination of lips, ridges, and depressions. Accordingly, while in the above described embodiments the endplate 105 may seat into the endplate seating channel 205, in other embodiments, alternative configurations for the endplate seating channel 205 may be used. For example, in some embodiments, the endplate seating channel 205 may be a protrusion that is received by a depression within the rim of the endplate 105. In some embodiments, the endplate seating channel 205 may be a ridge, lip, or a baffle against which one of the exterior facing surface 115 or the interior facing surface 120 of the endplate 105 may laterally abut.

According to various embodiments, the splice case alignment cutout 200 may be configured to releasably attach to the sealing flanges 165 (shown in FIG. 1) of a back cover member 135. The splice case alignment cutout 200 may include a mounting flange 225A extending from the back edge 235, and a mounting flange 225B extending from the front edge 240. The mounting flanges 225 may be configured to be releasably attached to the sealing flanges 165 of a back cover member 135. For example, in one set of embodiments, each of the mounting flanges 225 may include threaded holes to allow the mounting flanges 225 to be bolted to the sealing flanges 165 of the back cover member 135. In other embodiments, the mounting flanges 225 may be configured to be releasably attached, without limitation, via hooks, ties, screws, clips, latches, clamps, ties, straps, interference fit, or friction fit.

In various embodiments, the splice case alignment cutout 200 may further include an alignment guide 220 configured to releasably attach the mounting flanges 225 to the back cover member 135. For example, in some embodiments, the alignment guide 220 may be integrated as part of the mounting flanges 225. In other embodiments, the alignment guide 220 may be removable, and configured to releasably attach the mounting flange 225 to the sealing flange 165 of the back cover member 135. In one set of embodiments, the alignment guide 220 may be a removable alignment bolt. The alignment bolt may be threaded and configured to be received by threaded holes in both the mounting flanges 225 and sealing flanges 165. In some embodiments, the alignment bolt may not be threaded, and instead slide into a receiving interface, such as a threaded hole for a threaded bolt, temporarily holding the splice case alignment cutout 200 in place against the back cover member 135. In yet further embodiments, the alignment guide 220 may be a quick-release lock pin, such as, without limitation, a ball lock or positive lock pin. Correspondingly, the back cover member 135 may include one or more quick-release pin receptacles for receiving the quick release lock pin. In further embodiments, the splice case alignment cutout 200 may further include one or more optional carrying handles 230 to allow a technician to easily position, install, and remove the splice case alignment cutout 200.

Figure 3:
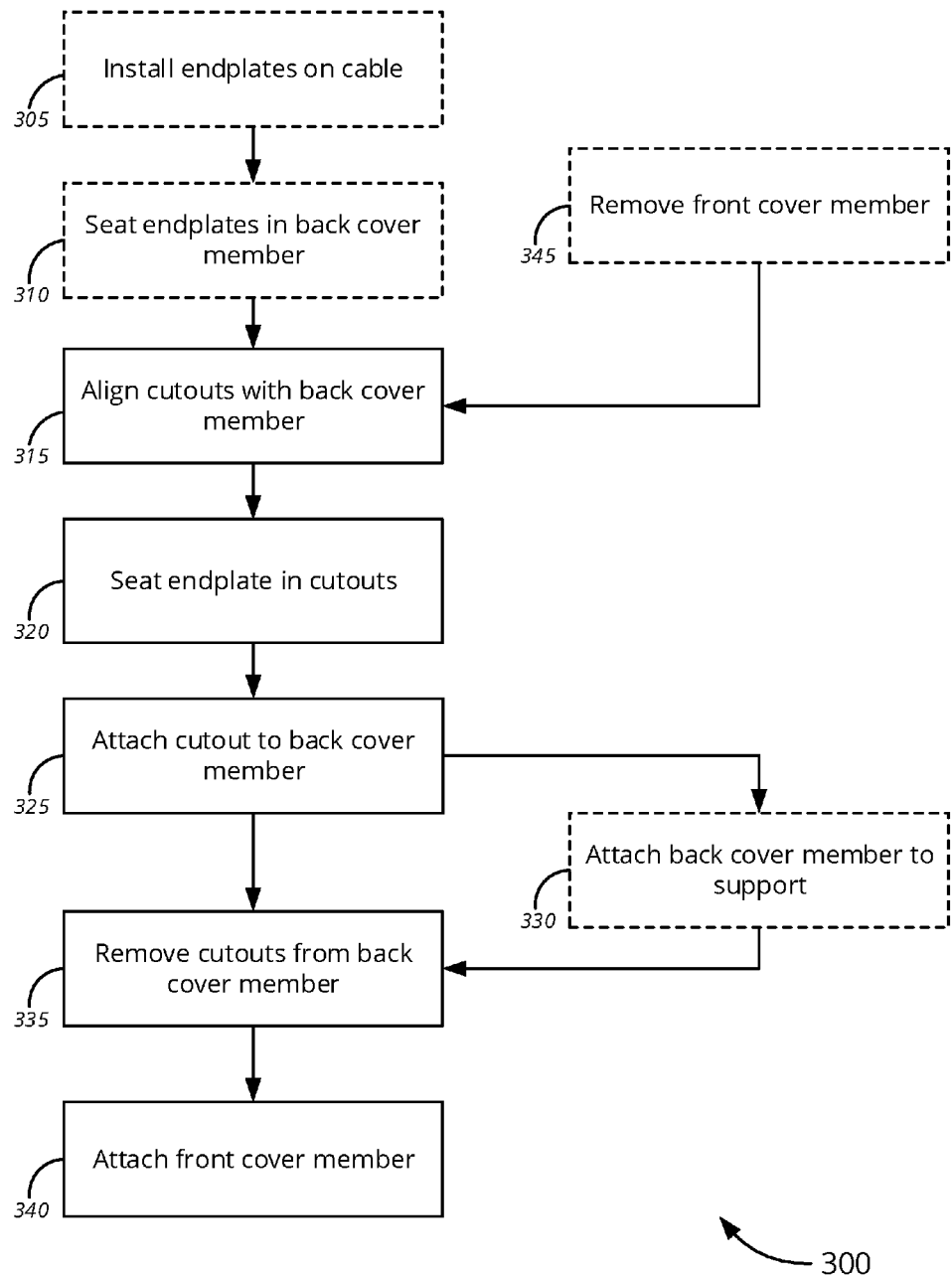
FIG. 3 is a flow diagram of a method for splice case alignment, in accordance with various embodiments.

FIG. 3 illustrates a flow diagram of a method 300 for splice case alignment using splice case alignment cutouts, in accordance with various embodiments. The method 300 begins at optional block 305, with respect to the installation of a splice case, by installing endplates on a cable. In various embodiments, as described above, the endplates may include one or more cable entry apertures, allowing a cable to pass through the endplate and be spliced to another cable. Accordingly, in various embodiments, a left endplate may be installed on a first section of cable to be spliced, and a right endplate may be installed on a second section of cable to be spliced to the first section. In one set of embodiments, the first section of cable may belong to a separate cable from the second section of cable. In other embodiments, the first and second sections may belong to the same cable. In various embodiments, the cable may be a twisted pair copper cable, a telephone line, or other cable used for telecommunications. In some embodiments, the endplates may be modular and may be assembled around the cable. In further embodiments, a splice case may maintain a vacuum seal or a negative pressure environment, and therefore the endplates may be configured to form a seal between the one or more cable entry apertures and the cables themselves, configured to maintain a vacuum or negative pressure environment within the splice chamber of the splice case.

The method 300 continues, at optional block 310, by seating the endplates into the back cover member. In various embodiments, the back cover member may have a have an elongated shape, extending longitudinally, from a left distal end to a right distal end. The back cover member may include an endplate seating channel at both the left distal end and the right distal end. The endplate seating channel may include, without limitation, a depression, lip, ridge, baffle, or any combination of depression, lip, ridge, and baffle, arranged transversely along the interior surface of the back cover member, and to which the endplate may be seated. Accordingly, a left endplate may be seated within or against an endplate seating channel located at the left distal end each of the back cover member. Similarly, a right endplate may be seated within or against an endplate seating channel located at the right distal end of the back cover member.

At block 315, a splice case alignment cutout may be aligned to the back cover member. In various embodiments, the back cover member might include sealing flanges extending longitudinally on one or more sides of the back cover member, from the left distal end to the right distal end. The splice case alignment cutouts may also each include mounting flanges configured to releasably attach the splice case alignment cutout to the sealing flanges. Accordingly, a left side splice case alignment cutout may be aligned with a left distal end of the back cover member, and a right side splice case alignment cutout may be aligned with a right distal end of the back cover member, thereby enabling each of the splice case alignment cutouts to releasably attach to the sealing flange at the left distal end or right distal end.

At block 320, each of the left and right endplates may be seated within a respective splice case alignment cutout. In various embodiments, each of the splice case alignment cutouts may include an endplate seating channel, similar to the back cover member. The endplate seating channel may include, without limitation, a depression, lip, ridge, baffle, or any combination of depression, lip, ridge, and baffle, arranged transversely along the interior surface of a respective splice case alignment cutout, and to which the endplate may be seated. Accordingly, a left endplate may be seated within or against an endplate seating channel of a left side splice case alignment cutout, and a right endplate may be seated within or against an endplate seating channel of a right side splice case alignment cutout. In one set of embodiments, the endplates may already be seated within a back cover member at a left distal end and right distal end, respectively. However, in other embodiments, the endplates may be seated within the endplate seating channels of the left side and right side cutouts respectively, before being seated within the respective endplate seating channels of the back cover member.

At block 325, the splice case alignment cutout is releasably attached to the back cover member. With the endplate seated in the endplate seating channel, the splice case alignment cutout may then be secured to the back cover member to ensure that the endplate is aligned with respect to the back cover member, and to prevent the position of the endplate from changing. According to various embodiments, the splice case alignment cutout may include mounting flanges configured to releasably attach to the sealing flanges of the back cover member. The splice case alignment cutout may include a mounting flange at both a back edge and front edge. In one set of embodiments, each of the mounting flanges may include threaded holes aligned to threaded holes on the sealing flange. Thus, the mounting flange may be bolted to the sealing flanges of the back cover member. In other embodiments, the mounting flanges may be configured to be releasably attached to the back cover member, without limitation, via hooks, ties, screws, clips, latches, clamps, ties, straps, an interference fit, or friction fit. In a further set of embodiments, the splice case alignment cutout may include an alignment guide, including, without limitation, a threaded bolt, sliding bolt, a ball lock pin, or positive lock pin. The sealing flange may, correspondingly, include one or more receiving interfaces, for the alignment guide including, without limitation, a threaded hole or quick-release pin receptacle. In some embodiments, the alignment guide may be part of the mounting flange itself, while in other embodiments, the alignment guide may be separately installed and removed from the mounting flanges.

After the splice case alignment cutouts have been releasably attached to the back cover member, and the endplates securely seated between the back cover member and splice case alignment cutouts, at optional block 330, the back cover member may then be attached to a support. In various embodiments, the support may be, without limitation, a rack, frame, or base. The splice case may then be attached to the support, without limitation, by being bolted, suspended, clipped, clamped, tied, strapped, hooked into, friction fit, interference fit, cradled, rested on, or otherwise attached in a manner suitable for the particular environment in which the splice case is used. The support may be configured to support the weight of each of the combined front cover member, back cover member, endplates, and cables. The splice case may be attached to the support in a manner to relieve stress and weight from the cables and end plates.

At block 335, the cutouts are removed from the back cover member. With the back cover member securely attached to the support, the splice case alignment cutouts may be removed without shifting the endplates, or otherwise altering the alignment of the endplates to the back cover member. The splice case alignment cutouts may then be replaced, at block 340, by attaching the front cover member to the back cover member. With the endplates properly aligned to the back cover member, the front cover member may be installed over the endplates also in alignment with the front cover member. Thus, once the front cover member is installed to the back cover member, all components of the splice case may be in alignment, and a successful seal may be formed.

With respect to a re-entry procedure for opening a splice case, the method 300 may alternatively begin, at optional block 345, by first removing the sealed front cover member from the back cover member. In various embodiments, this may include first re-pressurizing the splice case to gain access to the splice chamber, and subsequently unbolting or otherwise removing the front cover member from the back cover member, while leaving the endplates intact and seated within the back cover member. The method 300 may then continue, at blocks 315-340, by following the above described procedures. However, for purposes of re-entry, the splice case may already have been installed to a support. Therefore, the optional process of attaching the back cover member, at optional block 330, may be omitted in such embodiments.

While certain features and aspects have been described with respect to exemplary embodiments, one skilled in the art will recognize that numerous modifications are possible. Further, while various methods and processes described herein may be described with respect to particular structural and/or functional components for ease of description, methods provided by various embodiments are not limited to any particular structural and/or functional architecture, but instead can be implemented on any suitable hardware configuration. Similarly, while certain functionality is ascribed to certain system components, unless the context dictates otherwise, this functionality can be distributed among various other system components, structures, and features.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components and features described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A splice case alignment system comprising:
   a bottom cover member extending longitudinally and having a left distal end and a right distal end, wherein each of the left distal end and the right distal end of the bottom cover member comprises a first endplate seating channel extending transversely along an interior surface of the bottom cover member, wherein the interior surface of the bottom cover member defines a splice channel between the left distal end and the right distal end;
   at least two endplates comprising at least one left endplate and at least one right endplate, each of said endplates having a substantially planar structure and comprising:
      an outer surface facing outwardly away from the splice channel;
      an inner surface facing toward the splice channel;
      a rim defining a thickness of a corresponding one of said endplates and seating in a corresponding one of the first endplate seating channels of the bottom cover member; and
      one or more cable entry apertures that seat a cable passing through at least one of said endplates from the outer surface to the inner surface; and
   at least two splice case alignment cutouts comprising a left side splice case alignment cutout and a right side splice case alignment cutout, one of said cutouts releasably attaches to the left distal end and the other of the cutouts releasably attaches to the right distal end each of said cutouts further comprising a second endplate seating channel along an interior surface of a corresponding one of said cutouts, wherein each of the second endplate seating channels allows the rim of each respective one of said endplates to seat into the corresponding one of said cutouts;
   wherein when the at least one left endplate is seated in the second endplate seating channel of the left side splice case alignment cutout, the at least one right endplate is seated in the second endplate seating channel of the right side splice case alignment cutout, and the at least two splice case alignment cutouts are releasably attached to the bottom cover member, each of said endplates is aligned with respect to the corresponding one of the first endplate seating channels of the bottom cover member.

2. The system of claim 1, wherein each of the cutouts comprises one or more mounting flanges that releasably attach each of the cutouts to a corresponding one of the left distal end or the right distal end of the bottom cover member.

3. The system of claim 1, wherein each of the cutouts further comprises an alignment guide for engaging to the bottom cover member.

4. The system of claim 3, wherein the alignment guide is an alignment bolt.

5. The system of claim 3, wherein the alignment guide is a quick-release lock pin, and wherein the bottom cover member further comprises a quick-release pin receptacle at each of the left distal end and right distal end.

6. The system of claim 1 further comprising:
   a top cover member extending longitudinally and having a left distal end and a right distal end, wherein each of the left distal end and the right distal end of the top cover member comprises a third endplate seating channel extending transversely along an interior surface of the top cover member, wherein each of the third endplate seating channels allows the rim of each respective one of said endplates to seat into a corresponding one of the left distal end and the right distal end of the top cover member, wherein a volume formed between the at least two endplates, the bottom cover member, and the top cover member defines a splice chamber;
   wherein the cutouts are configured to be removable;
   wherein once the cutouts are removed, the top cover member releasably attaches to the bottom cover member and seats the at least two endplates while alignment is maintained between the at least two endplates and the bottom cover member.

7. The system of claim 1, wherein each of the first endplate seating channels of the bottom cover member and the at least two splice case alignment cutouts comprises at least one of a depression, lip, ridge, baffle, or any combination of depression, lip, ridge, and baffle.

8. The system of claim 7, wherein the rim of each of the at least two endplates comprises a depression that seats at least one of a lip or a baffle of a corresponding one of the first endplate seating channels.

9. The system of claim 7, wherein each of the first endplate seating channels includes one of a lip, ridge, or baffle that laterally abuts at least one of the outer surface or inner surface of the corresponding one of the endplates.

10. A method of splice case alignment comprising:
   providing a bottom cover member that extends longitudinally and that has a left distal end and a right distal end, wherein each of the left distal end and the right distal end of the bottom cover member comprises a first endplate seating channel extending transversely along an interior surface of the bottom cover member, wherein the interior surface of the bottom cover member defines a splice channel between the left distal end and the right distal end;
   providing at least two endplates comprising at least one left endplate and at least one right endplate;
   seating each of said endplates in a corresponding one of the first endplate seating channels of the bottom cover member, wherein each of said endplates has a substantially planar structure and comprises:
      an outer surface facing outwardly away from the splice channel;
      an inner surface facing toward the splice channel;
      a rim defining a thickness of a corresponding one of said endplates, wherein the rim seats in the corresponding one of the first endplate seating channels of the bottom cover member; and
      one or more cable entry apertures that seat a cable passing through at least one of said endplates from the outer surface to the inner surface;
   providing at least two splice case alignment cutouts that comprise a left side splice case alignment cutout and a right side splice case alignment cutout, one of said cutouts releasably attaches to the left distal end and the other of the cutouts releasably attaches to the right distal end each of said cutouts further comprising a second endplate seating channel along an interior surface of a corresponding one of said cutouts, wherein each of the second endplate seating channels allows the rim of each respective one of said endplates to seat into the corresponding one of said cutouts;
   aligning the at least two splice case alignment cutouts with the bottom cover member;
   seating the at least one left endplate within the corresponding one of the second endplate seating channels of the corresponding one of said cutouts;

seating the at least one right endplate within the corresponding one of the second endplate seating channels of the corresponding one of said cutouts; and releasably attaching each of said cutouts to the corresponding one of the left distal end and the right distal end of the bottom cover member.

11. The method claim 10, wherein each of the cutouts comprises an alignment guide, and wherein the method further comprises:

aligning each of the alignment guides with a corresponding receiving interface of the bottom cover member; and releasably attaching each of the cutouts to the bottom cover member via the corresponding one of the alignment guides.

* * * * *